United States Patent
Russell

(10) Patent No.: US 6,386,333 B1
(45) Date of Patent: May 14, 2002

(54) DISC BRAKE COOLING SYSTEM EMPLOYING HIGH SPEED PISTON PUMP

(76) Inventor: Robert J. Russell, P.O. Box 53, Manilla, IN (US) 46150

( * ) Notice: Subject to any disclaimer, the term of this patent is extended or adjusted under 35 U.S.C. 154(b) by 0 days.

(21) Appl. No.: 09/640,873

(22) Filed: Aug. 18, 2000

Related U.S. Application Data

(63) Continuation-in-part of application No. 09/150,923, filed on Sep. 10, 1998.
(60) Provisional application No. 60/058,788, filed on Sep. 12, 1997.

(51) Int. Cl.[7] ............................................. F16D 55/02
(52) U.S. Cl. ..................... 188/71.6; 188/72.5; 188/73.1; 188/151 R; 188/264 CC; 188/264 P
(58) Field of Search ............................... 188/71.1, 71.6, 188/72.1, 72.4, 72.5, 73.1, 106 R, 151 R, 264 R, 264 F, 264 CC, 264 P

(56) References Cited

U.S. PATENT DOCUMENTS

| | | | |
|---|---|---|---|
| 2,821,273 A | | 1/1958 | Sanford et al. |
| 3,584,709 A | * | 6/1971 | Conway ..................... 188/72.5 |
| 3,729,069 A | * | 4/1973 | Klein et al. ................ 188/72.5 |
| 4,014,410 A | | 3/1977 | Bryant |
| 4,431,091 A | | 2/1984 | Scibbe |
| 4,494,630 A | * | 1/1985 | Stoka et al. ............... 188/71.8 |
| 4,799,575 A | * | 1/1989 | Kroniger ................... 188/71.6 |
| 5,394,963 A | * | 3/1995 | Deane et al. .............. 188/71.1 |
| 5,445,242 A | | 8/1995 | Pogorzelski et al. |
| 5,515,948 A | * | 5/1996 | Gilliland ................... 188/72.5 |

FOREIGN PATENT DOCUMENTS

GB 775052 5/1957

* cited by examiner

*Primary Examiner*—Paul N. Dickson
*Assistant Examiner*—Devon Kramer
(74) *Attorney, Agent, or Firm*—Pillsbury Winthrop LLP

(57) ABSTRACT

The disc brake cooling system for a vehicle with hydraulic brakes has a sealed circular cooling system employing a piston pump which produces a very rapid flow of brake fluid through the brake lines and calipers constantly during non-braking of the vehicle. After braking, the constant rapid flow of the fluid cools the temperature of the fluid, and hence of the brakes, over the course of the rapid circular motion through the system so as to prevent boiling of the fluid.

15 Claims, 2 Drawing Sheets

DISC BRAKE COOLING SYSTEM EMPLOYING HIGH SPEED PISTON PUMP

PRIOR APPLICATIONS

This application is a continuation-in-part of my application Ser. No. 09/150,923, filed Sep. 10, 1998, and this application claims benefit of provisional application No. 60/058,788, filed Sep. 12, 1997, the contents of both being hereby incorporated hereinto by reference.

PREAMBLE

This invention relates to cooling of disc brakes, and in particular to the cooling of disc brakes for wheeled ground vehicles, which use hydraulic brakes such as mountain buses and high speed racing vehicles, without using special cooling equipment such as cooling fins or radiators.

DESCRIPTION OF RELATED ART

In the past, cooling of brake fluid in various kinds of vehicles has been accomplished by adding cooling equipment, in particular radiators and/or cooling fins. For example, see U.S. Pat. No. 4,014,410 to Bryant, U.S. Pat. No. 2,821,273 to Sanford et al., U.S. Pat. No. 4,431,091 to Scibbe, U.S. Pat. No. 4,394,963 to Deane et al. and U.S. Pat. No. 5,445,242 to Pogorzelski et al. and British Patent No. 775,052. In particular, as a representative example, note FIGS. 11–13 of the Bryant patent and their corresponding description beginning at the end of column 8. A low pressure, low efficiency, centrifuge type pump circulates brake fluid in a circular path through a caliper in a fluid path which includes a radiator or cooling fins if not both. I have determined that such external cooling equipment as a radiator or fins is not needed when my invention is employed.

SUMMARY OF THE INVENTION

An object of the present invention is to eliminate external cooling equipment such as radiators and fins for cooling hydraulic-operated disc brakes especially in high speed racing cars and other vehicles such as tourist buses which must operate in mountainous terrain.

This object is accomplished by utilizing a sealed cooling system employing a piston pump which produces a very rapid flow of brake fluid through the brake lines and calipers constantly during non-braking of a vehicle. After braking, the constant rapid flow of the fluid ultimately cools the temperature of the fluid over the course of the circular motion through the system, thereby preventing boiling of the brake fluid, without the need of external cooling equipment such as a radiator or fins.

Other objects and advantages of this invention will become apparent from the detailed description of the embodiments of the invention following this brief description of the drawing.

DETAILED DESCRIPTION OF EMBODIMENTS OF THE INVENTION

The invention is described with regard to a racing vehicle, but it is to be understood that the invention is useable in other types of vehicles which use hydraulic brakes, for example tourist buses which operate in mountains and consequently have a brake heating problem.

Figure 1:
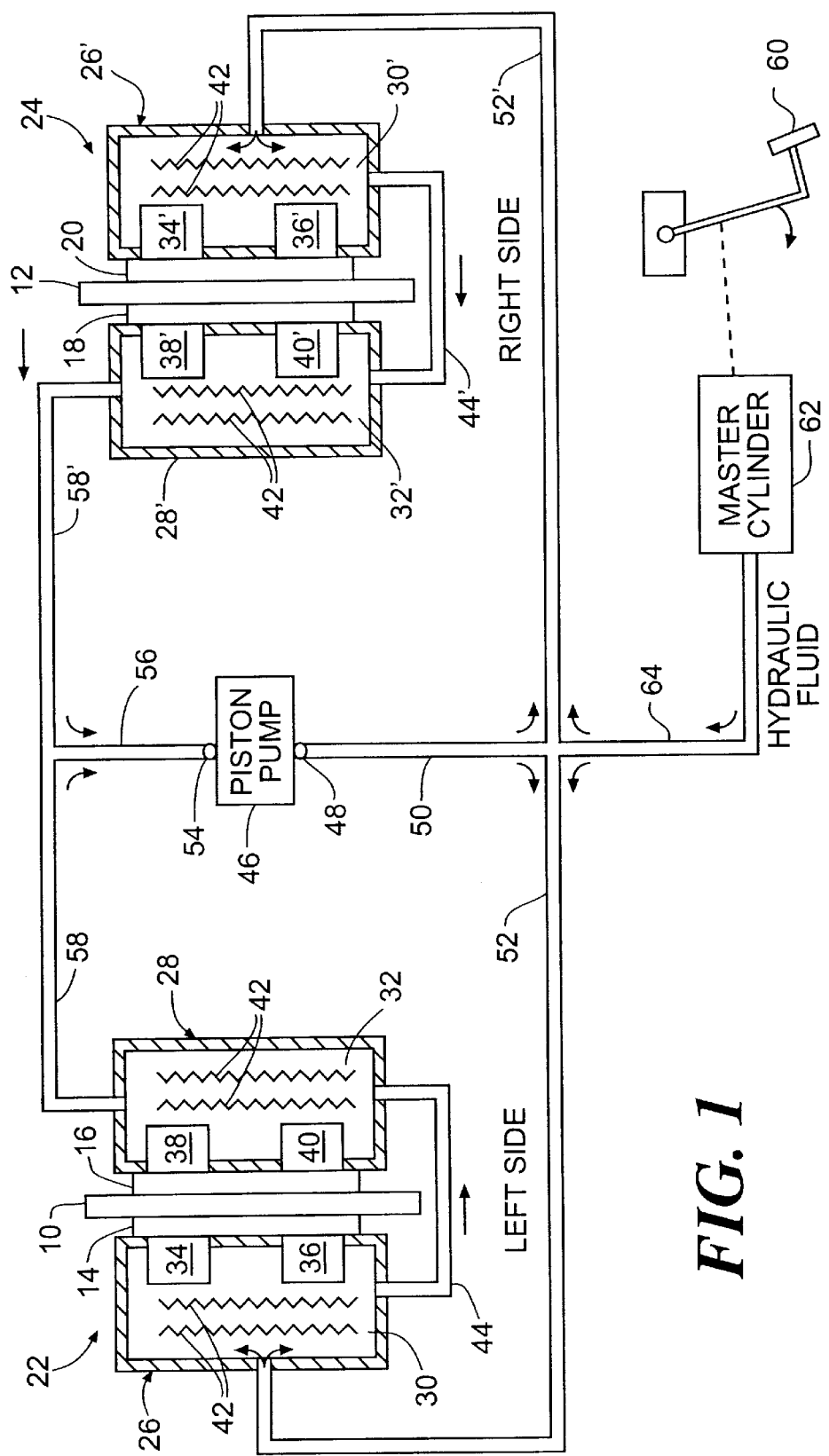
FIG. 1 schematically shows one embodiment of the invention.

In FIG. 1, rotors 10 and 12 represent discs of left and right side wheels (not shown) of a vehicle, for example the front wheels, and hence are referred to as left side disc 10 and right side disc 12. The left side and right side discs 10 and 12 are respectively sandwiched between conventional brake pads 14, 16 and 18, 20 which are operated by respective calipers 22 and 24.

For convenience and to eliminate certain unnecessary redundancies in description, only the left side caliper 22 is described in detail hereinafter. However, similar elements in the right side caliper have been given the same number primed.

Caliper 22 includes outer and inner casings 26 and 28 which respectively contain fluid tight chambers 30 and 32. Each caliper contains four pistons, two pistons 34, 36 being in the outer chamber 30 and two pistons 38, 40 being in the inner chamber 32, for pressing pads 14 and 16 against disc 10 when operated. As is standard, each of chambers 30 and 32 contain vanes 42.

The outer and inner fluid chambers 30 and 32 are connected by a fluid line 44.

A high speed piston type pump 46 has an outlet port 48 connected by fluid lines 50 and 52 to the outer chamber 30 and an inlet port 54 connected by fluid lines 56 and 58 to inner chamber 32 at the end opposite the connection of fluid line 44.

All fluid lines and the caliper chambers are filled with brake fluid and bled to be absolutely airless before starting any race, in the usual manner.

In operation, during high speed racing, pump 46 rapidly circulates brake fluid repeatedly, in the direction of the arrows from outlet 48 through lines 50, 52, chamber 30, chamber-connecting line 44, chamber 32, lines 58, 56 back to inlet port 54. Concurrently, the brake fluid also flows from line 50 not only to line 52 but to line 52', into the outer chamber 30' of the right side caliper 24, via chamber-connecting line 44' into inner chamber 32', out thereof at the opposite end into line 58' and back to the pump input port 54 via line 56.

When brake pedal 60 is depressed to slow the vehicle, master cylinder 62 presses on and effectively squeezes brake fluid in lines 64, 52 and 52' and the outer chambers 30 and 30' with sufficient pressure to operate pistons 34, 36 and 34', 36'.

The fluid pressure is also conveyed via chamber-connecting lines 44 and 44' to the inner chambers 32 and 32' to cause operation of pistons 38, 40 and 38', 40', thereby braking discs 10 and 12 by the pressure exerted thereon by brake pads 14, 16, 18 and 20 in the customary manner.

It is to be understood that the pressure exerted by master cylinder 62 on the brake fluid in the lines is much greater than that exerted by circulating pump 46 which means that the circulation of brake fluid by pump 46 is overridden during braking and effectively stops. It resumes, however, the instant braking ceases, to cool the brake fluid and calipers 22 and 24. When the brake is off, there is no residual brake pad pressure.

As above mentioned, when braking is not being effected during a race, pump 46 circulates the brake fluid at a high speed. Considering that standard brake lines in racing cars are 3/16 inch, the preferred flow rate of the brake fluid as pumped by piston pump 48 is around 21 inches per second or even higher if desired. For less efficient cooling the rate may be as low as around 10 inches per second. The best flow rate for any given racing car may require some experimentation with different flow rates to effect the desired cooling without employing a radiator or cooling fins in or on any of the fluid lines. Boiling of the fluid must surely be prevented by the fluid rate. Use is contemplated of the AP brake fluid typically used by NASCAR teams, which has a boiling point of 561°. However, initial experiments have shown the cooling to be 160° F. going into the calipers and 185° F. coming out of the calipers while the caliper metal was 436°.

As previously indicated, pump 46 is of the piston type and an exemplary type is made by Oildyne, a unit of Commercial Intertech Corp., Minneapolis, Minn., as a miniature fixed displacement, axial, high efficiency, piston pump, model HP 450 for which see their four-page catalog ASG-1, 1M, dated 4/94 and their eight-page catalog OD-103, 3M, dated 9/94, both of which are incorporated hereinto by reference, copies having been filed in the above mentioned provisional application.

Centrifugal pumps are not efficient with brake fluid so this invention requires pump 46 to be of the piston type as described.

Specifically, the cooling system of this invention was initially invented for stock car races including NASCAR events on short tracks in the Winston Cup, Busch Grand National, Truck, Winston, West, Featherlite Southwest and all other regional divisions but it could also be adapted for other racing series. The invention can be used with other types of vehicles as above mentioned.

Figure 2:
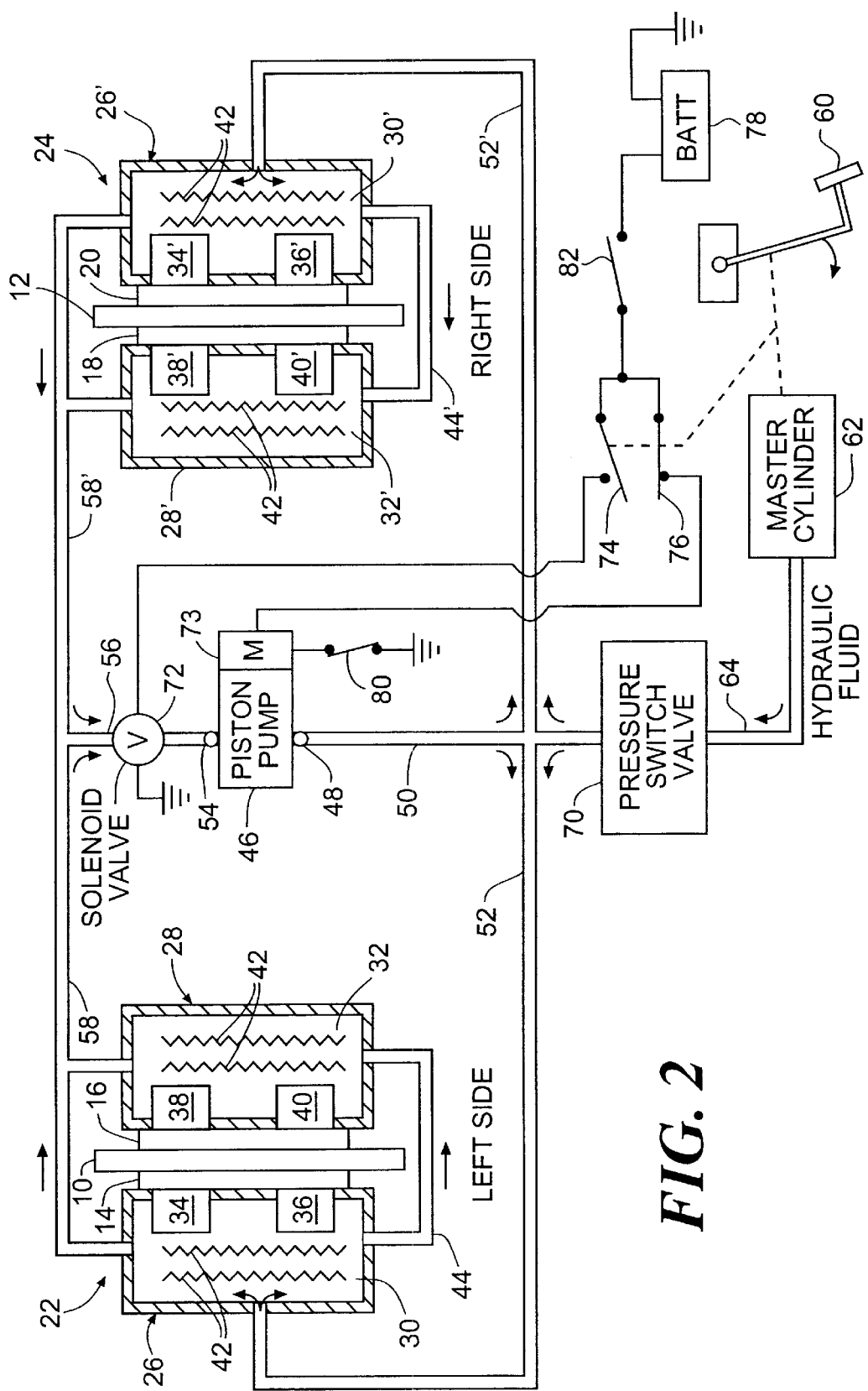
FIG. 2 schematically shows another embodiment of the invention.

Another embodiment of the invention is shown in FIG. 2. Elements which are the same as those described above relative to FIG. 1 are given the same number and are not redescribed except where they work in with the changes described below relative to FIG. 2.

Inserted in the hydraulic fluid line 64 is a pressure switch valve 70 which is normally closed but opens automatically when brake pedal 60 is depressed (in the direction of the arrow) to cause hydraulic fluid to flow in line 64. The pressure of that fluid is sufficient to open the pressure switch valve 70.

At the same time, the normally open solenoid valve 72 is closed and the piston pump motor 73 is turned off, respectively, by the closure of normally open switch 74 and the opening of normally closed switch 76. Switches 74 and 76 are connected to battery 78 and are operated by brake pedal 60 from their normal (illustrated) positions to their opposite positions when brake pedal 60 is depressed. Upon release of brake pedal 60, switches 74 and 76 move back to their normal positions, solenoid valve 72 reopens, motor 73 restarts, pump 46 starts pumping hydraulic fluid again and pressure switch valve 70 closes line 64, preventing pumped fluid from line 50 from flowing into line 64 and master cylinder 62.

The closing of solenoid valve 72 when brake pedal 60 is depressed protects the pump seals from being pushed out, and of course when solenoid valve 72 closes the piston pump 46 must be stopped which is accomplished when switch 76 opens as switch 74 closes. Of course, solenoid valve 72 could instead be of the normally closed type in which case switch 74 would be of the normally closed type so that the solenoid valve would be held open until the brake pedal is depressed.

A failure switch 80 may be included, if desired, so that in case of a pump/motor failure, power to motor 73 can be shut off. Master switch 82 should not be used in such instances as use of the master switch will prevent solenoid valve 72 from closing when the brake pedal 60 is depressed.

Further features and variations of the disclosed embodiments will become apparent to those skilled in the art and are intended to be covered by the appended claims.

I claim:

1. Friction disc brake apparatus including a cooling system for vehicles in combination with left side and right side wheel discs which require braking, cooling being effected without the need of cooling fins or a radiator, the apparatus comprising:

left and right side calipers respectively for said left and right side wheel discs, each caliper including outer and inner fluid tight chambers disposed on opposite sides of a respective wheel disc with the outer chamber for the left side caliper being on the outer side of said left side caliper and the outer chamber for the right side caliper being on the outer side of said right side caliper, a first chamber-connecting fluid line connecting the outer and inner chambers of said left side caliper, a second chamber-connecting fluid line connecting the outer and inner chambers of said right side caliper, a piston pump for pumping hydraulic fluid and having an inlet port and an outlet port, third fluid lines connecting said outlet port to each of said outer chambers, fourth fluid lines connecting each of said inner chambers to said inlet port of said pump, each of said calipers having a pair of friction pads respectively facing opposite sides of the respective wheel disc and, in said chambers, a pair of pistons for pushing the friction pads against said wheel discs, and braking means including a brake pedal and a master cylinder connected to each of said outer chambers via said third fluid lines for operating said pair of pistons in each of said chambers to brake said wheel discs when said brake pedal is actuated, said pump being operative to circulate said fluid repeatedly through said third fluid lines, said outer chambers, said first and second chamber-connecting fluid lines, said inner chambers and said fourth fluid lines back to said pump inlet port at a rate sufficient to prevent boiling of said brake fluid by sufficiently cooling said fluid without using said cooling fins or radiator for any of said fluid lines.

2. The combination as in claim 1, wherein said rate that the pump circulates said fluid is in the range of about 10 to at least 21 inches per second to effect cooling of said fluid.

3. The combination as in claim 1, wherein said rate that the pump circulates said fluid is about 21 inches per second to effect cooling of said fluid.

4. The combination as in claim 1, further including a pressure switch valve between said master cylinder and said third fluid lines for preventing said hydraulic fluid from said piston pump from flowing to said master cylinder while said brake pedal is unactuated and allowing braking fluid from said master cylinders to flow into each of said calipers to operate said pistons to effect braking of said wheel discs when said brake pedal is actuated.

5. The combination as in claim 1, wherein said piston-pump includes a pump motor, said combination further including a normally open solenoid valve between said piston pump and said fourth fluid lines, and switch means connected between a battery and both said pump motor and said solenoid valve for operating said pump motor while said brake pedal is unactuated and for turning off said pump motor and closing said solenoid valve when said brake pedal is actuated.

6. The combination as in claim 5, further including a pressure switch valve between said master cylinder and said third fluid lines for preventing said hydraulic fluid from said piston pump from flowing to said master cylinder while said brake pedal is unactuated and allowing braking fluid from said master cylinder to flow into each of said calipers to operate said pistons to effect braking of said wheel discs when said brake pedal is actuated.

7. The combination as in claim 1, wherein said pump is operative to circulate said fluid concurrently through one of said third fluid lines, one of said outer chambers, said first chamber-connecting fluid line, one of said inner chambers and one of said fourth fluid lines back to said pump inlet port and through another of said third fluid lines, another of said outer chambers, said second chamber-connecting fluid line, another of said inner chambers and another of said fourth fluid lines back to said pump inlet port.

8. Friction disc brake apparatus including a cooling system for vehicles in combination with left side and right side wheel discs which require braking, cooling being effected without the need of cooling fins or a radiator, the apparatus comprising:

a pair of calipers respectively for said wheel discs, each caliper including a pair of fluid tight, fluid connected chambers disposed on opposite sides of a respective wheel disc, a piston pump and fluid lines for pumping hydraulic fluid into each of said chambers and back to said piston pump, each of said calipers having a pair of friction pads respectively facing opposite sides of the respective wheel disc and, in said chambers, pistons configured to push the friction pads against said wheel discs, and braking assembly including a brake pedal and a master cylinder connected to said chambers for operating said pistons to brake said wheel discs when said brake pedal is actuated, said piston pump being operative to circulate said hydraulic fluid repeatedly through each of said chambers at a rate sufficient to prevent boiling of said brake fluid by sufficiently cooling said fluid without using said cooling fins or radiator in said friction disc brake apparatus.

9. The combination as in claim 8, wherein said rate that the pump circulates said fluid is in the range of about 10 to at least 21 inches per second to effect cooling of said fluid.

10. The combination as in claim 8, wherein said rate that the pump circulates said fluid is about 21 inches per second to effect cooling of said fluid.

11. The combination as in claim 8, further including a valve for allowing fluid through said valve only when said brake pedal is actuated for passing fluid from said master cylinder into said calipers to operate said pistons to effect braking of said wheel discs when said brake pedal is actuated.

12. The combination of claim 11, wherein said valve is a pressure switch valve.

13. The combination as in claim 8, wherein said piston pump includes a pump motor, said combination further including a solenoid valve on a return side of said piston pump and switch means for opening said solenoid valve and operating said pump motor to circulate said hydraulic fluid repeatedly as aforesaid while said brake pedal is unactuated and for closing said solenoid valve and turning off said pump motor to stop circulation of said hydraulic fluid when said brake pedal is actuated.

14. The combination as in claim 13, further including a pressure switch valve for allowing fluid through said pressure switch valve only when said brake pedal is actuated for passing fluid from said master cylinder into said calipers to operate said pistons to effect braking of said wheel discs when said brake pedal is actuated.

15. A friction disc brake apparatus including a cooling system for vehicles in combination with left and right side wheel discs, the apparatus comprising:

a left side caliper operatively associated with said left side wheel disc;

a right side caliper operatively associated with said right wheel disc;

said left side caliper and said right side caliper including a pair of fluid tight chambers disposed on opposite sides of a respective wheel disc;

a piston pump and fluid lines being configured to pump hydraulic fluid into each of said chambers and back to said piston pump;

a braking assembly including a brake pedal and a master cylinder connected to said chambers, said braking assembly being configured to brake said wheel discs once said brake pedal is actuated, said piston pump being operative to circulate said hydraulic fluid repeatedly through each of said chambers only when said brake pedal is unactuated.

\* \* \* \* \*